Feb. 4, 1969 KAZUO HUSIMI 3,426,182

DECIMAL COUNTING APPARATUS

Filed July 8, 1965 Sheet 1 of 3

Feb. 4, 1969 KAZUO HUSIMI 3,426,182

DECIMAL COUNTING APPARATUS

Filed July 8, 1965 Sheet 2 of 3

United States Patent Office 3,426,182

Patented Feb. 4, 1969

3,426,182

DECIMAL COUNTING APPARATUS

Kazuo Husimi, Tokyo, Japan, assignor to Takeda Riken Industry Company Limited, Tokyo, Japan Filed July 8, 1965, Ser. No. 470,390
Claims priority, application Japan, July 13, 1964, 39/39,708
U.S. Cl. 235—92 8 Claims
Int. Cl. G06c *19/00;* G06f *7/38*

ABSTRACT OF THE DISCLOSURE

A decimal counting apparatus includes a binary counting circuit and a decimal counting circuit, wherein multiplied carrying signals are delivered to an upper stage for one carrying signal from a lower stage thereby elevating the entire counting speed to the counting speed of a flip-flop circuit of the first stage thus providing the function necessary for the universal counting apparatus.

This invention relates to decimal counting apparatus.

An object of the present invention is to provide an economical counting apparatus by minimizing the number of expensive high speed switching elements to be used.

Another object of the present invention is to provide a counting apparatus high in reliability by reducing the number of high speed switching elements very liable to deteriorate.

A further object of the present invention is to provide a counting apparatus wherein the entire operating speed can be elevated to a limit possible with high speed switching elements or a binary counting circuit.

A still further object of the present invention is to provide a counting apparatus comparatively simple in construction and easy to manufacture by combining a conventional comparatively low speed decimal counting circuit with a few high speed counting circuits.

Figure 1:
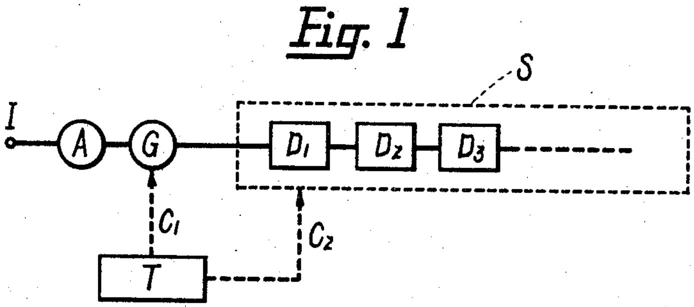
FIGURES 1 to 3 are block circuit diagrams showing conventional apparatus.

An apparatus for counting pulses or electric signals similar thereto, is already known and such apparatus is shown, for example, in FIGURE 1. In the drawing, I is an input terminal, A is an amplifying and pulse forming circuit, G is a gate circuit and T is a time base circuit. An electric current is passed through the gate circuit G periodically, for example, for 1 second through a control line $C_1$. S is a counting circuit, $D_1$, $D_2$, $D_3$ . . . etc. are counting circuit elements and $C_2$ is a control line for resetting the counting circuit S.

Figure 2:
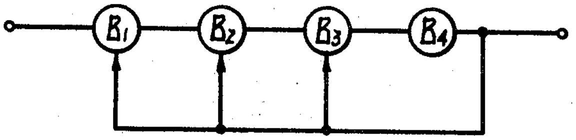

Now, if an input pulse is applied to the input terminal I, it will be amplified and then normalized to a definite pulse shape by the amplifying and pulse forming circuit A and will be led into the counting circuit S through the gate circuit G opened and closed by the time base circuit T so that counting may be carired out. It is already known that, in such case, when the counting circuit S is required to be of a decimal counting type, the counting circuit elements $D_1$, $D_2$, $D_3$ . . . etc. should be formed of decimal counting circuit elements and a number of them connected in series will be required according to the digit number. There are many different types of decimal counting circuit elements, in which the binary coded decimal counter in a widely used one. It is composed of 4 flip-flop circuits $B_1$, $B_2$, $B_3$ and $B_4$ connected in series, for example, as shown in FIGURE 2. This modulus 16 counter will be transformed as a decimal counting circuit element by using the feed back from output of $B_4$ to the preceding stages. However, in such case, it is necessary to delay the return pulse properly and apply it to the preceding stage in order to prevent any misoperation. By the delay time of this return pulse, the operating speed of the decimal counting circuit element will be reduced to a half or less than the operating speed of the flip-flop circuit itself.

In order to eliminate such a deficiency and elevate the operating speed to the speed of the flip-flop circuit, there has been considered a decimal indicating or recording system wherein the counting circuit S is composed of flip-flop circuits connected in series with a desired number of stages to form a binary counting circuit, and counting is carried out by the binary method and the result of the counting is then converted to a decimal number with a binary-decimal converting circuit. However, the converting circuit in such a system is so complicated and large that the system is not practical. For example, in case the converting circuit is to be formed of a diode matrix, in the case of 9 decimal digits, 30 binary stages will be required and the number of diodes required therefor will be more than $3 \times 10^{10}$ and its realization will be very difficult.

Further, there has been considered another method wherein the results of counting with a binary counting circuit are recounted with a decimal counting circuit. However, in such method, two series of binary and decimal counting circuits are required and therefore, there are deficiencies that not only are not economical but also the time necessary for counting will be increased. For example, after carrying out a count by opening the gate circuit in FIGURE 1 for 1 second, in order to convert it to a decimal count with a binary-demical coverting circuit, the same time will be required. Therefore, the time required for the count will be twice as long.

Figure 3:
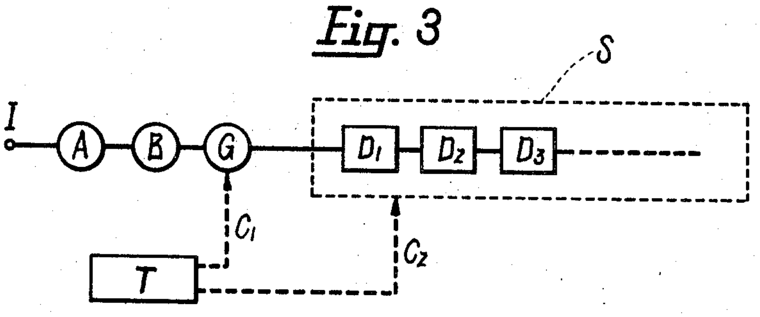

A further high speed counting method is a prescaler method wherein a flip-flop circuit B is inserted between the amplifying and pulse forming circiut A and the gate circuit G as shown in FIGURE 3. In such method, the maximum counting speed of the counting circuit S may be half of the maximum repetition rate of the input signal. However, the time to keep the gate circuit G open must be made twice as long as in the above described method.

In this method, only the flip-flop circuit B is added, as compared with the apparatus shown in FIGURE 1, and there is an advantage of speeding the counting rate to that of the flip-flop itself in a simple manner. However, as the result counted by the flip-flop circuit B is impossible to use, it is not adequate to use in universal counting apparatus. In case, for example, a time interval is to be measured by opening and closing the gate circuit with a start and stop time signal and the clock pulses are to be counted, it will be necessary to indicate the counted result as doubled. As a matter of fact, it is not practical.

According to the present invention, in order to eliminate the above described defects, a binary counting circuit and a decimal counting circuit are used as mixed and multiplied carrying signals are delivered to an upper stage for one carrying signal from a lower stage so that the entire counting speed may be elevated to the counting speed of the flip-flop circuit of the first stage and at the same time the function necessary for the universal counting apparatus may be kept.

Figure 4:
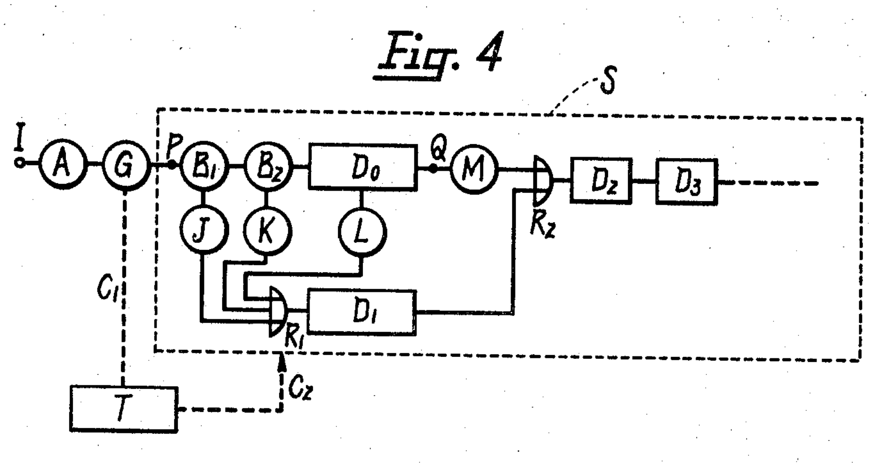
FIGURES 4 and 5 are block circuit diagrams showing apparatus embodying the present invention.

FIGURE 4 shows an embodiment of the present invention. Therein, I is an input terminal, A is an amplifying and pulse forming circuit, G is a gate circuit, T is a time base circuit, $C_1$ and $C_2$ are control lines, S is a counting circuit, $B_1$ and $B_2$ are binary counting circuit elements, $D_0$, $D_1$, $D_2$ and $D_3$ are decimal counting circuit elements and J, K and L are pulse generators.

The pulse generator J is so formed that, after the count is finished, according to the numbers memorized by the circuit element $B_1$, when the number stored in the circuit element $B_1$ is "1", one pulse may be generated and, when it is "0," no pulse may be generated. The pulse generator K is so formed that, when the number stored in the circuit element $B_2$ is "1," two pulses may be generated and, when it is "0," no pulse may be generated. The pulse generator L is constructed to generate 4 times as many pulses as the number stored in the circuit element $D_0$. M is a pulse generator for feeding 4 pulses into an upper counting apparatus per carrying pulse from the circuit element $D_0$. $R_1$ and $R_2$ are or-gate circuits.

Now, an input signal applied to the input terminal I will be amplified and normalized to a definite pulse shape by the amplifying and pulse forming circuit A and will enter the binary counting circuit element $B_1$ through the gate circuit G, the carrying signal from said element $B_1$ will enter the circuit element $B_2$ and further the output of the circuit element $B_2$ will enter the demical counting circuit element $D_0$. Therefore, when a modulus 40 counting circuit is formed of the circuit elements $B_1$, $B_2$ and $D_0$ and 40 pulses have entered the point P, one carrying pulse will appear at the point Q or the carrying output terminal of the circuit element $D_0$. In an ordinary decimal counting circuit, when 10 input pulses have entered, one pulse will be delivered in the upper stage. But, in the circuit of the above mentioned circuit elements $B_1$, $B_2$ and $D_0$, one pulse will be delivered to the upper stage for 40 input pulses and therefore the counting result above 10-order will be ¼ the actual number of pulses applied to the input. As it is, said circuit will not be a decimal counting circuit. Therefore, in the present invention, the circuit is so formed that 4 pulses may be generated from the pulse generator M in response to carrying signal pulse from the circuit element $D_0$ and may be delivered to the circuit element $D_2$. Thus, a normal decimal counting result will be given to the circuit element $D_2$ and others following it. Because the first stage is not a decimal but a modulus 40 counting circuit which is composed of the circuit elements $B_1$, $B_2$ and $D_0$ instead of the ordinal decimal counter in which one carrying pulse appears for 10 input pulses, only one carrying pulse will come out of the circuit element $D_0$ for 40 input pulses and therefore the counted number will be different from the usual result. For example, if the number of pulses applied to the modulus 40 counting stage is 67, one carrying signal from the circuit element $D_0$ will be multiplied by 4 in the pulse generator M and will enter the circuit element $D_2$ through the or-gate circuit $R_2$ and the remainder of 27 will be memorized in the modulus 40 counting circuit which is composed of the circuit elements $B_1$, $B_2$ and $D_0$. Here, of the 27, 7 should be delivered to the circuit element $D_0$, 20 should be delivered to the upper stage so that the circuit elements $D_1$, $D_2$, $D_3$ . . . etc. may give the final counting results. For this purpose, in the present invention, after the gate circuit G is closed and the counting is completed, if the number in the circuit element $B_1$ is "0," no pulse will be generated from the pulse generator J and, if it is "1," one pulse will be delivered to the circuit element $D_1$ through the or-gate circuit $R_1$. Then, if the number in the circuit element $B_2$ is 0, no pulse will be generated from the pulse generator K and, if it is "1," 2 pulses will be successively delivered to the circuit element $D_1$ through the or-gate circuit $R_1$ in the structure. In the modulus 40 counting circuit, 27 will be stored as $B_1=1$, $B_2=1$ and $D_0=6$. Therefore, into the circuit element $D_1$ will be delivered $B_1\times1+B_2\times2+D_0\times4=27$ pulses. 20 pulses of these will overflow to become 2 carrying pulses and will be delivered to the circuit element $D_2$ through the or-gate circuit $R_2$ and the number 7 of 1-order will remain in the circuit element $D_1$. In the circuit element $D_2$, 4 from the first pulse generator M and 2 from the circuit element $D_1$, totalling 6, will have been counted.

Therefore, the numbers in the circuit elements $D_1$, $D_2$, $D_3$ . . . etc. will be the decimal counting results to be obtained.

It is one of the features of the present invention thus that the binary counting circuit and decimal counting circuit are used together so that, after the gate circuit G on the input side is closed, the number in the modulus 40 counting circuit may be converted to obtain a correct decimal count number.

One of the other features of the present invention by using the modulus 40 counting circuit shall now be explained. Now, if a direct count of a high speed pulse of 200 mc. is considered, a flip-flop circuit operating in response to 200 mc. will be required for the circuit element $B_1$. However, the circuit element $B_2$ may operate in response to ½ of them or to 100 mc. and the circuit element $D_0$ may be a decimal counting circuit operating in response to 50 mc. Therefore, the circuit element $D_0$ can be an ordinary transistor type decimal counting circuit.

Further, a decimal counting circuit operating in response to 20 mc. is sufficient for the circuit element $D_2$. High speed switching elements such as Esaki diodes are required for the circuit elements $B_1$ and $B_2$. They are expensive and not so stable. Their stability is not as good as in transistors. However, in the present invention, the number of such high speed switching elements to be used can be reduced compared to the case using the usual feed back technique.

In the above has been shown the case, for example, of a counting apparatus of 200 mc. which is formed by using the modulus 40 counting circuit. However, the present invention can be worked not only by using such modulus 40 counting circuit but also by using modulue $n\times10$ counting circuit wherein $n$ is an integer.

Figure 5:
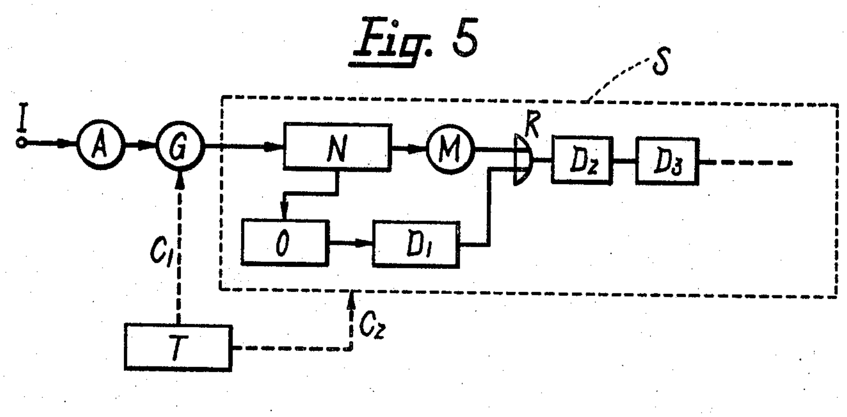

FIGURE 5 is a view showing the above mentioned general case. S is a counting circuit consisting of the modulus $n\times10$ counting circuit N, a pulse multiplying circuit M delivering $n$ pulses for one input pulse, an or-gate circuit R, decimal counting circuit elements $D_2$, $D_3$ . . . etc. of 10-order, 100-order, etc., a counting pulse delivering circuit O generating as many pulses as the pulses counted in said modulus $n\times10$ counting circuit N and a decimal counting circuit element $D_1$. The other character designations are the same as in FIGURE 4.

Figure 6:
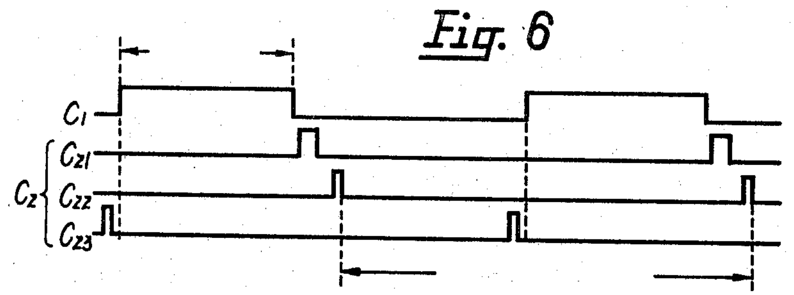
FIGURE 6 is a view for explaining the operation of an apparatus according to the present invention.

An input signal from the input terminal I will be amplified and normalized to a definite pulse shape by the amplifying and pulse forming circuit A, will enter the counting circuit N through the gate circuit G opening periodically for a fixed time (for example, 1 second) and will be directly counted therein. Then, after the gate circuit G is closed, the pulse delivery circuit O will start, the numbers of the 1-order counted in the counting circuit N will be left in the circuit element $D_1$, the numbers above the 10-order will be delivered to the higher order counting circuit elements $D_2$, $D_3$ . . . etc. by the carrying signal from the circuit element $D_1$ and the conversion will be completed. Further, the gate circuit G will be opened and closed by the time base circuit T through the control line $C_1$. The results of the counting circuit S will be converted and reset by the control signals through the control line $C_2$. This process is shown in FIGURE 6. That is to say when the control line $C_1$ is activated, the gate circuit G will be opened and the input pulses will be counted for the counting time. After the count is completed and the gate circuit G is closed, by the signal $C_{21}$ in the control line $C_2$, as many pulses as the number in the modulus $n\times10$ counting circuit will be fed into the element $D_1$ of the decimal counting circuit from the counting pulse delivery circuit and the conversion will be completed. The time required for this conversion is far shorter than the counting time. When the conversion is completed, the counted result stored in $D_1$, $D_2$, $D_3$ . . . will be transferred to a memory circuit if necessary, by the memory transfer signal $C_{22}$ of the numbers in the circuit elements $D_1$, $D_2$, $D_3$ . . . etc. and then will be reset by the signal $C_{23}$ so as to be ready for the next count.

In case there is no memory indication, after the completion of the conversion, the memorized number will be kept and indicated until the resetting is carried out.

Further, $n$ in this embodiment need not be limited to 2, 4 or 8 but may be any number of 3, 5, 6, 7, 9 or 10 or larger.

Figure 7:
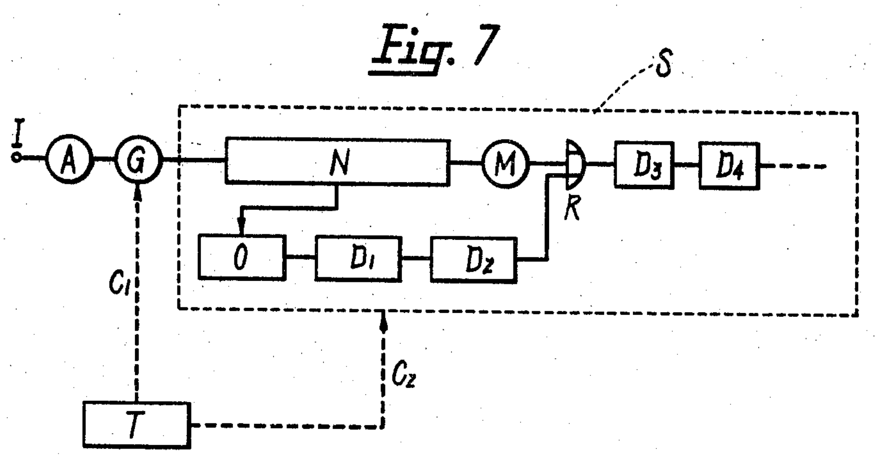
FIGURES 7 and 8 are views showing other apparatus embodying the present invention.

FIGURE 7 shows an embodiment having a modulus $n\times100$ counting circuit N used in the first stage. The character designations therein are the same as in each of the above mentioned drawings. However, in this embodiment, as the counting circuit N is formed to be of an modulus $n\times100$ counting type, in order to convert the counted number into a decimal number, two stages of decimal counting circuit elements $D_1$ and $D_2$ are provided.

In any of the above embodiments, the counting pulse delivery circuit for converting numbers in the modulus $n\times10$ or modulus $n\times100$ counting circuit can be formed of not only the one shown in FIGURE 4 but also any other circuit. Further, as pulses of the first one or two digits of decimal numbers, that is, less than 100, the repetition rate of the pulses is not required to be high so there is no special technical difficulty to generate.

Figure 8:
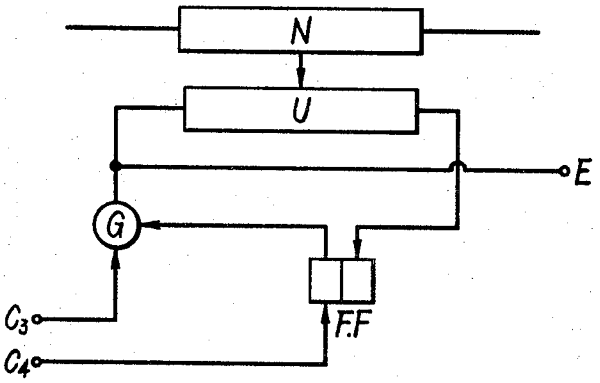

FIGURE 8 shows one of the simplest examples of the counting pulse delivering circuit O shown in FIG. 5. Therein a complementary number for $n\times10$ in a modulus $n\times10$ counting circuit is put into a complementary number register U. A flip-flop circuit FF is put in a starting state with a conversion starting signal from a terminal $C_4$, then the gate circuit G is opened and pulses from a terminal $C_3$ are led into the complementary number register U. Said complementary number register consists of the same modulus $n\times10$ counting circuit but its operating speed is not required to be high. When the complementary number register is fulfilled by the pulses from the terminal $C_3$ and carrying pulses appear from the modulus $n\times10$ counting circuit, then the flip-flop circuit FF turns off and the gate circuit G is closed. In this way, the same number of pulses stored in the modulus $n\times10$ counting circuit will come out of the output terminal E.

What is claimed is:

1. A decimal counting apparatus comprising a series connected circuit for counting a number of pulses fed thereto, said circuit including a non-decimal counting circuit and a decimal counting circuit, a signal pulse multiplying circuit for multiplying carrying signal pulses from said series connected circuit, a counting signal pulse generating circuit for generating pulses corresponding to the remainder of the number of pulses to be counted which are not carried by said series connected circuit, a decimal counting circuit of 1-order connected to the counting signal pulse generating circuit for recounting the pulse number from said counting signal pulse generating circuit to a decimal number, and a decimal counting circuit of at least 10-order into which the signal pulses from said signal pulse multiplying circuit and carrying signal pulse from said decimal counting circuit of 1-order are fed.

2. A decimal counting apparatus according to claim 1 wherein said signal pulse multiplying circuit is operative for multiplying the carrying signal pulse from said series connected circuit by the base number of said non-decimal counting circuit, said counting signal pulse generating circuit generating pulses, the number of which corresponds to the counted number remaining in said series connected circuit by an externally controlled signal after completion of the counting for a predetermined counting time by said series connected circuit, said decimal counting circuit of an 1-order recounting the number of the pulses generated from said pulse generating circuit simultaneously with the generating of the pulses by said pulse generating circuit.

3. The decimal counting apparatus according to claim 1, wherein said series connected circuit includes a second decimal counting circuit.

4. The decimal counting apparatus according to claim 1, wherein said non-decimal counting circuit of said series connected circuit is a ternary counting circuit, said signal pulse multiplying circuit multiplying the number of pulses of the carrying signal from said series connected circuit by three times, said counting signal pulse generating circuit generating a number of pulses corresponding to counting numbers of less than 29 which are the remainder of the pulses not delivered into the decimal counting circuit of said series connected circuits.

5. The decimal counting apparatus according to claim 1, wherein said non-decimal counting circuit of said series connected circuit is a quaternary counting circuit, said signal pulse multiplying circuit multiplying the number of pulses of the carrying signal from said series connected circuit by four times, said counting signal pulse generating circuit generating a number of pulses corresponding to counting numbers of less than 39 which are the remainder of the pulses not delivered into the decimal counting circuit of said series connected circuit.

6. The decimal counting apparatus according to claim 1 comprising a complementary number register for delivering the output signal when the complementary number for a full scale of the number counted by the series connected circuit is read in and the number of pulses of the input signal reached the full scale, means for opening a gate circuit by a count instructing signal and for closing the gate circuit by an output signal from said complementary number register, and a counting signal generator including the gate circuit for leading the input signal pulse to said complementary number register while it is controlled and opened by said means, and, at the same time using said input signal pulse as an output.

7. The decimal counting apparatus according to claim 1, wherein the non-decimal counting circuit comprises first and second binary counting circuit elements, said signal pulse generating circuit including a pulse generator wherein the number in the first binary counting circuit element is "1," one pulse will be generated and, when it is "0," no pulse will be generated, a second pulse generator wherein, when the number in the second binary counting circuit element is "1," two pulses will be generated and, when it is "0," no pulse will be generated, and a third pulse generator for generating pulses 4 times as many as the number stored in the decimal counting circuit connected in series with said two binary counting circuit elements.

8. The decimal counting apparatus according to claim 7, wherein said signal pulse multiplying circuit connected to said series connected circuit comprises a pulse generator for feeding four pulses for each carrying pulse from the decimal counting circuit of said series connected circuit to the subsequent decimal circuit.

References Cited

UNITED STATES PATENTS

| | | | |
|---|---|---|---|
| 3,267,266 | 8/1966 | Mori | 235—92 X |
| 3,321,608 | 5/1967 | Sterling | 235—92 |
| 3,350,547 | 10/1967 | Brockett | 235—92 |

DARYL W. COOK, *Primary Examiner.*

G. J. MAIER, *Assistant Examiner.*